United States Patent
Livschitz et al.

(10) Patent No.: US 10,609,587 B2
(45) Date of Patent: Mar. 31, 2020

(54) SYSTEM, METHOD, AND COMPUTER PROGRAM PRODUCT FOR LOCATION-BASED DETECTION OF INDICATOR ANOMALIES

(71) Applicants: Michael Livschitz, Rosh Ha'ayin (IL); Yakir Weissman, Rosh Ha'ayin (IL); Moshe Tocker, Rosh Ha'ayin (IL); TEOCO Corporation, Fairfax, VA (US)

(72) Inventors: Michael Livschitz, Givat Zeev (IL); Ayal Weissman, Yakir (IL); Moshe Tocker, Tel Aviv (IL)

(73) Assignee: TEOCO Corporation, Fairfax, VA (US)

( * ) Notice: Subject to any disclaimer, the term of this patent is extended or adjusted under 35 U.S.C. 154(b) by 0 days.

(21) Appl. No.: 15/498,471

(22) Filed: Apr. 27, 2017

(65) Prior Publication Data
US 2017/0318555 A1  Nov. 2, 2017

Related U.S. Application Data

(60) Provisional application No. 62/330,177, filed on May 1, 2016.

(51) Int. Cl.
*H04W 24/10* (2009.01)
*H04W 16/18* (2009.01)
*H04W 28/02* (2009.01)

(52) U.S. Cl.
CPC ........... *H04W 24/10* (2013.01); *H04W 16/18* (2013.01); *H04W 28/0236* (2013.01)

(58) Field of Classification Search
CPC ............................. H04W 72/04; H04W 16/12
See application file for complete search history.

(56) References Cited

U.S. PATENT DOCUMENTS

| | | | |
|---|---|---|---|
| 7,519,860 B2 | 4/2009 | Hatonen et al. | |
| 8,452,871 B2 | 5/2013 | Ge et al. | |
| 8,665,835 B2 | 3/2014 | Hussein et al. | |
| 2007/0028219 A1 | 2/2007 | Miller et al. | |
| 2013/0324111 A1 | 12/2013 | Tontinuttanon et al. | |
| 2014/0295791 A1* | 10/2014 | Cai ................... | H04M 15/8027 455/406 |

(Continued)

*Primary Examiner* — Charles N Appiah
*Assistant Examiner* — Frank E Donado
(74) *Attorney, Agent, or Firm* — ATFirm PLLC; Ralph P. Albrecht

(57) ABSTRACT

A location-based system detects anomalies in performance indicators of telecommunication networks. The system generates a plurality of service areas, each service area including a plurality of adjacent cell sites. A performance indicator of a first service area of the plurality of service areas is selected and an aggregated service area performance indicator is generated, by aggregating the selected performance indicator for each cell site of the plurality of cell sites of the first service area. Generation of the plurality of service areas may be related to a determined network traffic threshold. The threshold may be related to: total bandwidth provided by a cell site, or total number of calls handled by a cell site. The selected indicator may be, for example the call set-up success rate (CSSR), or the drop call rate (DCR). An alert related to the aggregated indicator may be generated.

17 Claims, 3 Drawing Sheets

(56) References Cited

U.S. PATENT DOCUMENTS

| | | | |
|---|---|---|---|
| 2015/0009857 A1* | 1/2015 | Rath | H04W 16/18 370/254 |
| 2015/0156780 A1* | 6/2015 | Kim | H04L 5/0035 370/331 |
| 2015/0264582 A1* | 9/2015 | Brighenti | H04W 16/08 455/446 |

* cited by examiner

SYSTEM, METHOD, AND COMPUTER PROGRAM PRODUCT FOR LOCATION-BASED DETECTION OF INDICATOR ANOMALIES

CROSS REFERENCE TO RELATED APPLICATIONS

The present disclosure is a U.S. NonProvisional Patent Application, which claims the benefit under 35 U.S.C. Section 119(e) of U.S. Provisional Patent Application No. 62/330,177, Conf. No. 3260, filed May 1, 2016, entitled, "A System and Method for Location-Based Detection of Indicator Anomalies," the contents of which is incorporated herein by reference in its entirety.

BACKGROUND

Technical Field of the Disclosure

The disclosure herein generally relates to performance indicators in cellular networks and particularly to location-based detection of anomalies in performance indicators in cellular networks.

Related Art

Systems having multiple elements communicating with each other, such as, e.g., but not limited to, telecommunications networks often require performance measurement. Performance indicators, such as, e.g., but not limited to, key performance indicators (KPIs), key quality indicators (KQIs), or the like, are used to evaluate operational activities, for example system down-time, number of dropped calls and the like. Occasionally anomalies occur which an operator of such systems desires to know about as soon as possible. Locating disruptions of service are not always straightforward tasks, as data from performance indicators may sometimes be misleading.

It would therefore be advantageous to provide a system and method to better utilize performance indicators with respect to a disruption of services in a cellular network.

SUMMARY

An example embodiment of the claimed invention sets forth a system, method, and/or computer program product for location based detection of indicator anomalies.

According to one example embodiment, a computer implemented method for a computerized method for detection of communications performance indicator anomalies of dynamic service areas of a cellular network, the method can include: generating, by at least one computer processor, a first service area comprising a plurality of antenna coverage sectors, the first service area having cellular network traffic exceeding a first threshold; selecting, by the at least one computer processor, a performance indicator; receiving, by the at least one computer processor, information required for generating the performance indicator from each antenna coverage sector of the plurality of antenna coverage sectors; and generating, by the at least one computer processor, a service area indicator for the first service area, related to the information of each of the plurality of antenna coverage sectors.

According to one example embodiment, the computer implemented method can further include determining, by the at least one computer processor, a network traffic threshold.

According to one example embodiment, the computer implemented method can further include generating, by the at least one computer processor, a second service area; identifying, by the at least one computer processor, a second plurality of antenna coverage sectors, providing, by the at least one computer processor, in aggregate service to a number of user devices exceeding, or equal to, the network traffic threshold; and associating, by the at least one computer processor, each of the plurality of second antenna coverage sectors with the generated second service area.

According to one example embodiment, the computer implemented method can include where the determined network traffic threshold comprises at least one of: a static, dynamic, or adaptive threshold.

According to one example embodiment, the computer implemented method can include where the determined network traffic threshold is related to at least one of: total bandwidth provided to a plurality of user devices by an antenna coverage sector, or a total number of sessions for which the antenna coverage sector provides connectivity.

According to one example embodiment, the computer implemented method can include where the first service area is associated with a plurality of network elements.

According to one example embodiment, the computer implemented method can include where a network element of the plurality of network elements can include at least one of: a manageable logical entity uniting one or more physical devices; a facility; equipment used in provision of a telecommunications service; a database; a signaling system; equipment used in transmission, routing, billing or collection of a telecommunications service; a telephone exchange; a computer cluster; a node; an STP; a gateway; a network device; a switch; a softswitch device; or a network switch.

According to one example embodiment, the computer implemented method can include where the performance indicator comprises at least one of: a key performance indicator (KPI), or key quality indicator (KQI).

According to one example embodiment, the computer implemented method can include where the information is related to at least one of: call set-up success rate (CSSR), or drop call rate (DCR).

According to one example embodiment, the computer implemented method can further include generating an alert related to the service area indicator.

According to one example embodiment, the computer implemented method can further include storing, by the at least one computer processing, the generated service area indicator in at least one of: a computer memory, or a storage device.

According to one example embodiment, the computer implemented method can include where a first antenna coverage sector of the plurality of antenna coverage sectors is located on a first cell tower, and a second antenna coverage sector of the plurality of antenna coverage sectors is located on a second cell tower.

According to another example embodiment, a monitoring system for location based detection of indicator anomalies in a telecommunication network, the system can include: a computer processing unit; a network interface, coupled to said computer processing unit, for connecting the monitoring system to the telecommunication network; a memory, coupled to said computer processing unit, containing instructions that, when executed by said computer processing unit, configure the system to: select a performance indicator; select a first service area from a plurality of service areas, each service area comprising a plurality of adjacent antenna coverage sectors; and generate a service area performance indicator for the first service area, by aggregating the performance indicator for each sector of the plurality of adjacent antenna coverage sectors.

According to another example embodiment, the monitoring system can further include where the memory further comprises instructions that when executed by said computer processing unit configure the system to: determine a network traffic threshold.

According to another example embodiment, the monitoring system can further include where the memory further comprises instructions that when executed by said computer processing unit configure the system to: generate a new service area; identify a plurality of adjacent antenna coverage sectors, wherein each antenna coverage sector is adjacent to at least another antenna coverage sector, and the plurality of adjacent antenna coverage sectors provide together service to a total number of users exceeding, or equal to, the network traffic threshold; and associate the plurality of adjacent antenna coverage sectors with the generated new service area.

According to another example embodiment, the monitoring system can include where the determined network traffic threshold comprises at least one of: a static, dynamic, or adaptive threshold.

According to another example embodiment, the monitoring system can include where the determined network traffic threshold is related to at least one of: total bandwidth provided to a plurality of user devices by a cell site, or a total number of calls handled by a cell site.

According to another example embodiment, the monitoring system can include where the selected performance indicator comprises at least one of: a key performance indicator (KPI), or key quality indicator (KQI).

According to another example embodiment, the monitoring system can include where the selected performance indicator is a measurement of at least one of: call set-up success rate (CSSR), or drop call rate (DCR).

According to another example embodiment, the monitoring system can include where the memory further comprises instructions that when executed by the computer processing unit configure the system to: generate an alert related to the service area performance indicator.

According to another example embodiment, the monitoring system can further include where the memory further comprises instructions that when executed by the computer processing unit configure the system to: store the generated service area performance indicator in a memory.

According to yet another example embodiment, a non-transitory computer readable medium having instructions stored thereon, the instructions when executed on the one or more computer processing units cause the one or more computer processing units to execute a method for detection of indicator anomalies of dynamic service areas of a cellular network, the method can include: generating a first service area comprising a plurality of antenna coverage sectors, the first service area having cellular network traffic exceeding a first threshold; selecting a performance indicator; receiving information required for generating the performance indicator from each antenna coverage sector of the plurality of antenna coverage sectors; and generating a service area indicator for the first service area, related to the information of each of the plurality of antenna coverage sectors.

BRIEF DESCRIPTION OF THE DRAWINGS

The foregoing and other objects, features and advantages will become apparent and more readily appreciated from the following detailed description taken in conjunction with the accompanying drawings, in which.

DETAILED DESCRIPTION OF VARIOUS EXEMPLARY EMBODIMENTS

Figure 1:
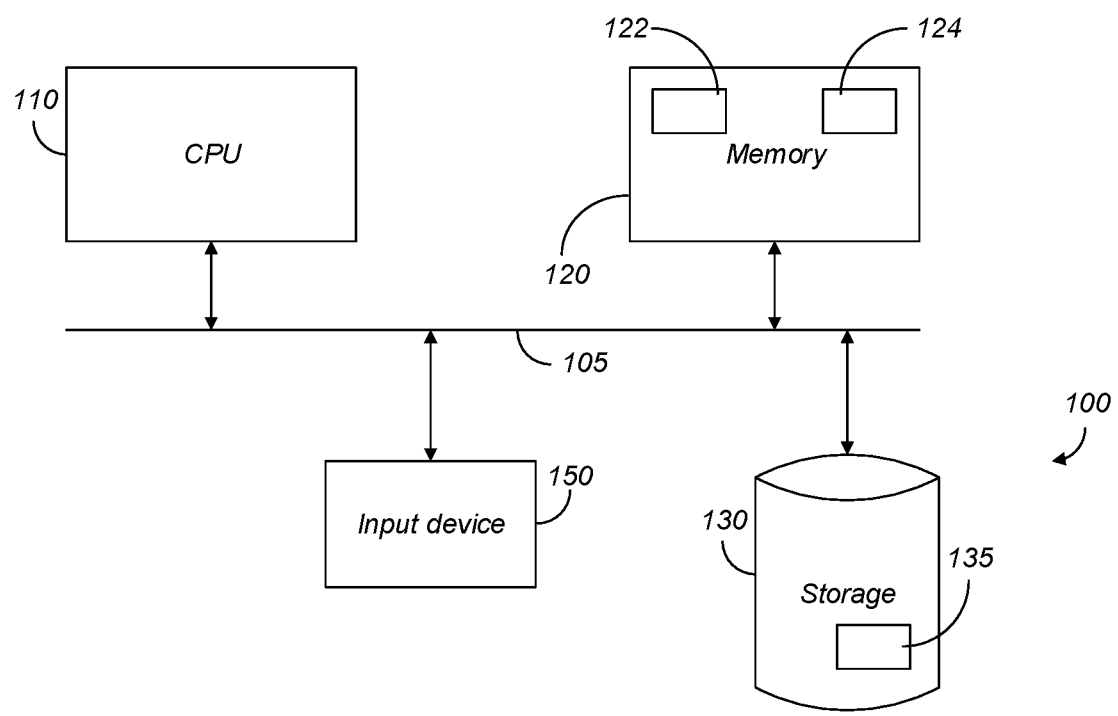
FIG. 1—is a schematic illustration of system for location-based detection of indicator anomalies implemented according to an embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

A location-based system detects anomalies in performance indicators of telecommunication networks, according to an exemplary embodiment. The system generates a plurality of service areas, each service area including a plurality of adjacent cellular communications network sites ("cell sites"). A performance indicator of a first service area of the plurality of service areas is selected and an aggregated service area performance indicator can be generated, by aggregating the selected performance indicator for each cell site of the plurality of cell sites of the first service area. Generation of the plurality of service areas may be related to a determined network traffic threshold. The determined network traffic threshold can be related to: total bandwidth provided by a cell site, or total number of calls handled by a cell site. The selected indicator can be, for example, but not limited to, the call set-up success rate (CSSR), or the drop call rate (DCR). An alert related to the aggregated service area performance indicator may be generated.

FIG. 1 is an exemplary and non-limiting schematic illustration of system 100 for location-based detection of telecommunications performance indicator anomalies implemented according to an embodiment. The system 100 comprises or can include, according to an exemplary embodiment, at least one processing element 110, for example, a central processing unit (CPU). The CPU, according to an exemplary embodiment, can be coupled via one or more of bus 105 to one or more of memory 120. The memory 120 can further include a memory portion 122 that can include instructions that when executed by the processing element 110 can perform the method described in more detail herein. The memory may be further used as a working scratch pad for the processing element 110, a temporary storage, and others, as the case may be. The memory may include, e.g., but not limited to, volatile memory such as, e.g., but not limited to random access memory (RAM), or non-volatile memory (NVM), such as, e.g., but not limited to, Flash memory. Memory 120 may further comprise memory portion 124 containing an aggregated indicator of a service area. The processing element 110 may be coupled to an input 150. The processing element 110 may be further coupled with a database 130. Database 130 may be used, e.g., but not limited to, for the purpose of holding a copy of the method executed in accordance with the disclosed technique. Database 130 can include, e.g., but not limited to, a flat file database, a hierarchical database, a relational database, and/or or graph database, etc., and the like. Database 130 may further comprise storage portion 135 containing a plurality of service areas, each service area including a plurality of sectors.

Figure 2:
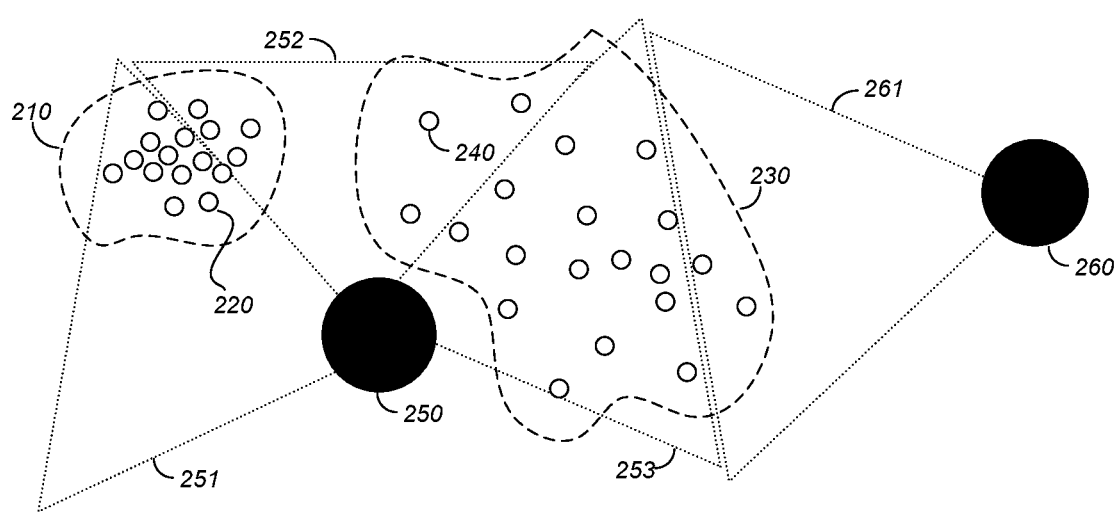
FIG. 2—is a schematic illustration of a first and second service area, and a portion of the cellular network elements therein, according to an embodiment.

FIG. 2 is an exemplary and non-limiting schematic illustration of a first and second service area, and a portion of the cellular network elements therein, according to an embodiment. A first service area, generated by a server, such as, e.g., but not limited to, server 100, can include a plurality of user devices. Each user device can be operative for communicating with the cellular network. The user devices may be mobile devices, such as, for example, but not limited to, smart phones, tablets, communications devices, computing devices, and the like. A first service area 210 can include a first plurality of user device 220-1 through 220-N, generally referenced as user device 220. In some embodiments, the plurality of user devices 220 generate together network traffic exceeding a first threshold. In certain embodiments, the plurality of user devices 220 are located such that the distance between a first user device and a second user device does not exceed a second threshold. In yet another embodiment, the plurality of user devices 220 are located such that the distance between the first user device and the second user device does not exceed the second threshold, and the total number of user devices exceeds a third threshold, according to an exemplary embodiment. According to an exemplary embodiment, the third threshold can serve as a minimum number of devices for a service area. For example, but not limited to, the number of devices in a given service area can be required to exceed a certain minimum number, e.g., to avoid defining a service area with only, e.g., but not limited to, 1, or 2 devices, if that is not desirable, in an exemplary embodiment. A second service area 230 includes a second plurality of user devices 240-1 through 240-M, generally referenced as user device 240. A first cell tower 250 includes a first plurality of sector antennas defining sectors, which may also be referenced herein as cell sites. A first sector 251 of the first cell tower 250 provides network connectivity to a cellular network for a first portion of the first plurality of user devices 220. A second sector 252 of the first cell tower 250 provides network connectivity to the cellular network for a second portion of the first plurality of user devices. The first cell tower 250, the first sector 251 and second sector 252 may each be a network element associated with the first service area 210. A second cell tower 260 includes a first sector 261 of the second cell tower 260 which provides network connectivity to a cellular network for a first portion of the second plurality of user devices 240. The second sector 252 of the first cell tower 250 provides network connectivity to the cellular network for a second portion of the second plurality of user devices 240. A third sector 253 provides network connectivity to the cellular network for a third potion of the plurality of user devices 240. The first sector 261 of the second cell tower 260, the second sector 252 and the third sector 253 may each be a network element associated with the second service area 230. It is understood that the network elements for each service area are exemplary, and may include, in some embodiments, a further breakdown to individual components, both physical and virtual, and other network elements which are not shown in FIG. 2 and have effect on the functionality of the network elements which are shown herein. In the above, 'N' and 'M' are natural integers, having each a value of '1' or greater.

Figure 3:
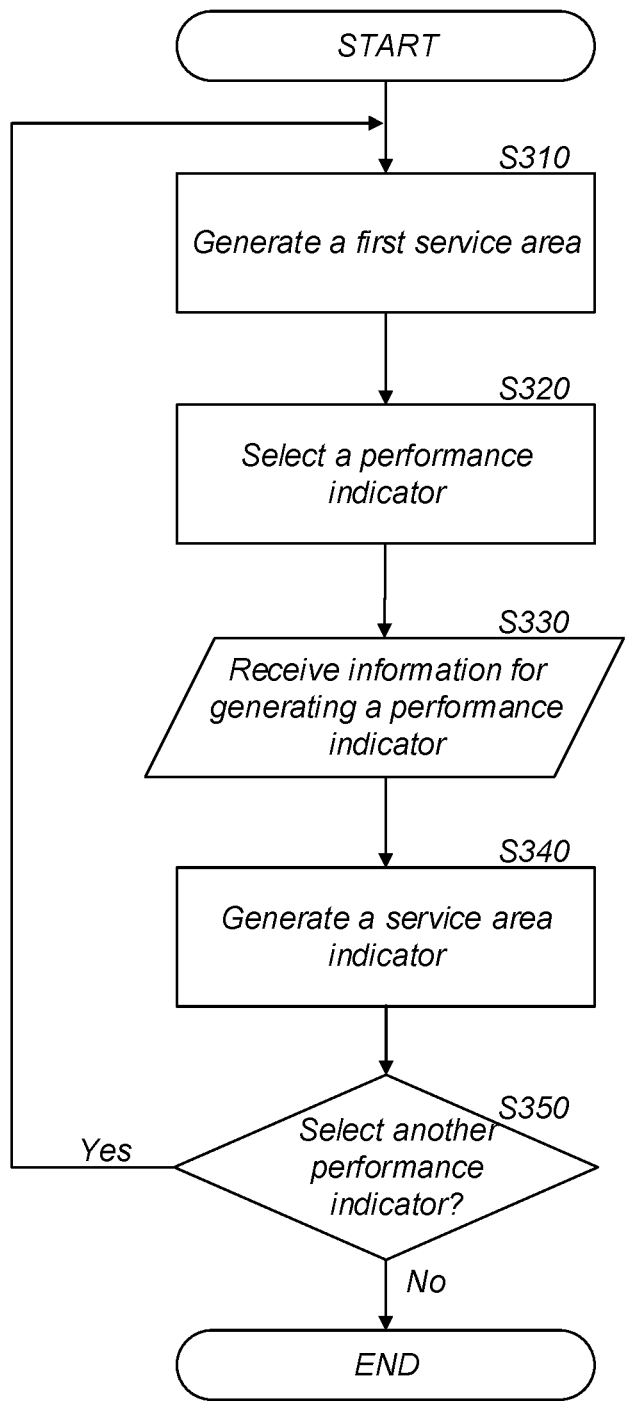
FIG. 3—is a flowchart of a method for detection of indicator anomalies in a dynamic service area, in accordance with an embodiment.

FIG. 3 is an exemplary and non-limiting flowchart of a method for detection of indicator anomalies in a dynamic service area, in accordance with an embodiment. In 310 a first service area is generated, for example by a server 100. A service area includes a plurality of network elements which are part of an infrastructure providing wireless access to a cellular network for a plurality of user devices. A sector antenna can provide coverage for a geographic region (also referred to as a "sector"), typically with some overlap between two neighboring sector antennas. Each sector may also be referred to as a cell site. A sector antenna can be deployed in a base station of a cellular network. The base station can further include, e.g., but not limited to, a transceiver, a radio network interface, etc. The components can be typically placed on a radio mast, tower or other location higher than its surroundings. A plurality of such components may be placed in a single location with sector antennas directed in different directions, creating adjacent cell sites (i.e., adjacent sectors). A sector antenna can enable communication between a user device and other elements of the cellular network. In an embodiment, service areas may be generated related to network traffic. A system, such as, e.g., but not limited to, dynamic service area generator 100, can determine a network traffic threshold. Each service area can be generated to include a plurality of sector antennas, the sector antennas can provide together coverage to a number of example user devices. In an embodiment, the number of user devices may exceed, or be equal to, the network traffic threshold. The threshold may be static, dynamic or adaptive. Static thresholds are predetermined thresholds that remain constant, according to an exemplary embodiment. Dynamic thresholds can be forcefully changed, for example, but not limited to, at a certain time of day, or a certain day of the year, etc., according to an exemplary embodiment. Adaptive thresholds are changed in response to changes in characteristics of the network and may vary depending on a variety of parameters, according to an exemplary embodiment. Network traffic may be measured, for example by total bandwidth consumed by user devices serviced by a sector antenna at any given time, or in another exemplary embodiment, by total number of sessions handled by a sector antenna per time unit, according to an exemplary embodiment. In 320 an indicator, such as, e.g., but not limited to, a performance indicator, or a communications performance indicator is selected, according to an exemplary embodiment. The indicator may be related to performance of a plurality of sector antennas. In some embodiments, the indicator may be, for example, but not limited to, a key performance indicator (KPI), or a key quality indicator (KQI), etc., and the like, according to an exemplary embodiment. In certain embodiments, the performance indicator may be a measurement such as, e.g., but not limited to, any of: call set-up success rate (CSSR), or drop call rate (DCR), etc., and the like, according to an exemplary embodiment. In 330 information required for generating a performance indicator is received from a plurality of network elements, according to an exemplary embodiment. In an exemplary embodiment, a network element may be a sector antenna. For example, in a service area including three sector antennas, information may be the DCR from each of the sector antennas, according to an exemplary embodiment. In an exemplary embodiment, the three sector antennas may be dispersed on one to three different cell towers, according to an exemplary embodiment. In 340 a service area indicator for the first service area is generated, related to the information of each of the plurality of network elements, according to an exemplary embodiment. This may be performed, for example, by aggregating the performance indicator for each network element which the service area indicator is related to, according to an exemplary embodiment. In another exemplary embodiment this may be performed by first aggregating the information of each performance indicator, then generating a service area indicator from the aggregated information. In 350 a check can be performed to determine if another performance indicator should be selected. If it is determined to be yes that another performance indicator should be selected, then execution can continue at 310, otherwise execution can terminate, according to an exemplary embodiment.

In some embodiments, alerts may be generated related to the service area indicator. For example, a cellular network operator may require generation of an alert when the DCR for any given cell site rises over, e.g., but not limited to, 1% (one percent), according to an exemplary embodiment. By generating service area indicator for the DCR, the network operator may generate other, more indicative, alerts. In this example, an alert might be generated if the aggregated DCR indicator of a first service area rises over, e.g., but not limited to, 0.8% (eight tenths of a percent), according to an exemplary embodiment. Referring again to FIG. 2, another example may be generation of alerts using, e.g., but not limited to, fuzzy logic, according to an exemplary embodiment. In this example, an alert is generated if the aggregated DCR of the second service area 260 is above a value of, e.g., but not limited to, 1% (one percent), or if any DCR value is above 1% (one percent), according to an exemplary embodiment. In this example, aggregation is performed by adding the numerical value of each DCR value of sector antennas 261 and 253, according to an exemplary embodiment. Suppose, e.g., that sector antenna 261 has a DCR value of 0.2% (two tenths of a percent), and sector antenna 253 has a DCR value of 0.9% (nine tenths of a percent), providing an aggregated DCR value for second service area of 1.1% (one and one tenth of a percent), according to an exemplary embodiment. While the value for each cell may be acceptable by the network operator's standard, the aggregated value can indicate that there is a problem. By servicing sector antenna 253, for example, the network operator may improve the DCR value for the entire second service area 261.

The principles disclosed herein can be implemented as hardware, firmware, software or any combination thereof, according to various exemplary embodiments. Moreover, the software is preferably implemented as an application program tangibly embodied on a program storage unit or computer readable medium. The application program may be uploaded to, and executed by, a machine comprising any suitable architecture. Preferably, the machine can be implemented on a computer platform having hardware such as, e.g., but not limited to, a processing unit ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as, e.g., but not limited to, an additional data storage unit and a display unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for detection of communications performance indicator anomalies of dynamic service areas of a cellular network, the method comprising:
   generating, by at least one computer processor, a first generated service area comprising a first plurality of antenna coverage sectors of the cellular network, the first generated service area having cellular network traffic exceeding a first network traffic threshold;
   selecting, by the at least one computer processor, a performance indicator;
   receiving, by the at least one computer processor, information required for generating the performance indicator from each antenna coverage sector of the first plurality of antenna coverage sectors,
   wherein the information is related to:
      call-set-up success rate (CSSR) and drop call rate (DCR);
   generating, in response to the selection of the performance indicator, a first aggregated service area indicator for the first generated service area, related to the information of each of the first plurality of antenna coverage sectors
   determining, by the at least one computer processor, a second network traffic threshold;
   generating, by the at least one computer processor, a second generated service area;
   identifying, by the at least one computer processor, a second plurality of antenna coverage sectors of the cellular network;
   generating, by the at least one computer processor, a second aggregated service area indicator for the second generated service area, related to information required for generating the performance indicator from each antenna coverage sector of the second plurality of antenna coverage sectors, wherein the information is related to:
      call-set-up success rate (CSSR) and drop call rate;
   providing in aggregate, by the at least one computer processor, service to a number of user devices of the second generated service areas having cellular network traffic exceeding, or equal to, the second network traffic threshold;
   associating, by the at least one computer processor, each of the second plurality of antenna coverage sectors with the second generated service area;
   determining that there is a problem with a sector antenna of the first or the second plurality of antenna coverage sectors when an aggregated DCR of any of the first or second service area is above a predetermined percentage value, wherein the aggregated DCR is determined by adding a numerical value of each DCR value of each sector antenna associated with their respective service area and determining a sum of each of the DCR values of each sector antenna; and based on the determination that there is a problem with sector antenna:
generating at least one alert related to the first or the second aggregated service area indicator comprising at least one or more of:
the first generated service area; or
the second generated service area.

2. The computerized method of claim 1, wherein the determined network traffic threshold comprises at least one of: a static, dynamic, or adaptive threshold.

3. The computerized method of claim 1, wherein the determined network traffic threshold is related to at least one of: total bandwidth provided to a plurality of user devices by an antenna coverage sector, or a total number of sessions for which the antenna coverage sector provides connectivity.

4. The computerized method of claim 1, wherein the first service area is associated with a plurality of network elements.

5. The computerized method of claim 4, wherein a network element of the plurality of network elements comprises at least one of:
a manageable logical entity uniting one or more physical devices;
a telecommunication facility;
equipment used in provision of a telecommunications service;
a database;
a signaling system;
equipment used in transmission, routing, billing or collection of a telecommunications service;
a telephone exchange;
a computer cluster;
a node;
an STP;
a gateway;
a network device;
a switch;
a softswitch device; or
a network switch.

6. The computerized method of claim 1, wherein the performance indicator comprises at least one of: a key performance indicator (KPI), or key quality indicator (KQI).

7. The computerized method of claim 1, further comprising:
storing, by the at least one computer processing, the generated service area indicator in at least one of: a computer memory, or a storage device.

8. The computerized method of claim 1, wherein a first antenna coverage sector of the plurality of antenna coverage sectors is located on a first cell tower, and a second antenna coverage sector of the plurality of antenna coverage sectors is located on a second cell tower.

9. The method according to claim 1, wherein said generating the at least one alert comprises:
generating at least one alert based on fuzzy logic,
wherein said generating said at least one alert based on fuzzy logic comprises:
generating an alert when at least one or more of:
an aggregated information of the second generated service area is determined to be above a value of a first predetermined percentage network threshold, or
any information is determined to be above a second predetermined percentage network threshold.

10. The method according to claim 9, further comprising at least one or more of:
a) the network traffic threshold comprising:
a minimum total number of devices for at least one of:
the first generated service area; or
the second generated service area; or
b) for the first or the second generated service area, at least one or more of:
i) a first user device of the number of user devices comprising:
said first user device being located at a distance not to exceed a distance threshold;
ii) a total number of the user devices are determined to exceed a minimum total number of devices threshold;
iii) a total bandwidth consumed not exceeding a maximum bandwidth threshold,
iv) a total number of user devices serviced not exceeding a maximum number of devices serviced threshold, or
v) a total number of sessions handled per time limit not exceeding a maximum number of sessions handled threshold.

11. A monitoring system for location based detection of indicator anomalies in a telecommunication network, the system comprising:
a computer processing unit;
a network interface controller, coupled to said computer processing unit, for connecting the monitoring system to the telecommunication network;
a memory, coupled to said computer processing unit, containing instructions that, when executed by said computer processing unit, configure the system to:
generate a first generated service area comprising a first plurality of antenna coverage sectors of the telecommunication network, the first generated service area having telecommunication network traffic exceeding a first network traffic threshold;
select a performance indicator;
receive information required for generating the performance indicator from each antenna coverage sector of the first plurality of antenna coverage sectors, wherein the information is related to:
call-set-up success rate (CSSR) and drop call rate (DCR);
generate, in response to the selection of the performance indicator, a first aggregated service area indicator for the first generated service area, related to the information of each of the first plurality of antenna coverage sectors;
determine a second network traffic threshold;
generate a second generated service area;
identify a second plurality of antenna coverage sectors;
generate a second aggregated service area indicator for the second generated service area, related to information required for generating the performance indicator from each antenna coverage sector of the second plurality of antenna coverage sectors,
wherein the information is related to:
call set-up success rate (CSSR), and
drop call rate (DCR);
provide in aggregate, service to a number of user devices of the second generated service areas having network traffic exceeding, or equal to, the second network traffic threshold;
associate each of the second plurality of antenna coverage sectors with the second generated service area; and determine that there is a problem with a sector antenna of the first or the second plurality of antenna coverage sectors when an aggregated DCR of any of the first or second service area is above a predetermined percentage value, wherein the aggregated DCR is determined by adding a numerical value of each DCR value of each sector antenna associated with their respective service area and determining a sum of each of the DCR values of each sector antenna;

wherein the memory further comprises instructions that when executed by the computer processing unit configure the system to:
based on the determination that there is a problem with the sector antenna, generate at least one alert related to the first or the second aggregated service area indicator comprising at least one or more of:
the first generated service area: or
the second generated service area.

12. The monitoring system of claim 11, wherein the determined network traffic threshold comprises at least one of: a static, dynamic, or adaptive threshold.

13. The monitoring system of claim 11, wherein the determined network traffic threshold is related to at least one of: total bandwidth provided to a plurality of user devices by a cell site, or a total number of calls handled by a cell site.

14. The monitoring system of claim 11, wherein the selected performance indicator comprises at least one of: a key performance indicator (KPI), or key quality indicator (KQI).

15. The monitoring system of claim 11, wherein the selected performance indicator is a measurement of at least one of: the call set-up success rate (CSSR), or the drop call rate (DCR).

16. The monitoring system of claim 11, wherein the memory further comprises instructions that when executed by the computer processing unit configure the system to: store the generated service area performance indicator in a memory.

17. A non-transitory computer readable medium having instructions stored thereon, the instructions when executed on one or more computer processing units cause the one or more computer processing units to execute a method for detection of indicator anomalies of dynamic service areas of a cellular network, the method comprising:
generating a first generated service area comprising a first plurality of antenna coverage sectors of the cellular network, the first generated service area having cellular network traffic exceeding a first network traffic threshold;
selecting a performance indicator;
receiving information required for generating the performance indicator from each antenna coverage sector of the first plurality of antenna coverage sectors, wherein the information is related to:
call-set-up success rate (CSSR) and drop call rate (DCR);
generating a first aggregated service area indicator for the first generated service area, related to the information of each of the first plurality of antenna coverage sectors^ comprising
wherein the information is related to:
call set-up success rate (USSR), and
drop call rate (DCR);
determining, by the at least one computer processor, a network traffic threshold; generating, by the at least one computer processor, a second generated service area;
identifying, by the at least one computer processor, a second plurality of antenna coverage sectors of the cellular network:
generating, by the at least one computer processor, a second aggregated service area indicator for the second generated service area, related to information required for generating the performance indicator from each antenna coverage sector of the second plurality of antenna coverage sectors,
wherein the information is related to:
call-set-up success rate (CSSR) and drop call rate;
providing in aggregate, by the at least one computer processor, service to a number of user devices of the second generated service areas having telecommunication network traffic exceeding, or equal to, the second network traffic threshold;
associating, by the at least one computer processor, each of the second plurality of antenna coverage sectors with the second generated service area;
determining, by the at least one computer processor, that there is a problem with a sector antenna of the first or the second plurality of antenna coverage sectors when an aggregated DCR of any of the first or second service area is above a predetermined percentage value, wherein the aggregated DCR is determined by adding a numerical value of each DCR value of each sector antenna associated with their respective service area and determining a sum of each of the DCR values of each sector antenna; and
based on the determination that there is a problem with a the sector antenna:
generating at least one alert related to the first or the second aggregated service area indicator comprising at least one or more of:
the first generated service area: or
the second generated service area.

* * * * *